United States Patent
Belmonte Mula et al.

(10) Patent No.: US 11,793,132 B2
(45) Date of Patent: Oct. 24, 2023

(54) ROTATIONAL SYSTEM FOR HYDROPONIC EQUIPMENT

(71) Applicant: NEW GROWING SYSTEMS, S.L., Almeria (ES)

(72) Inventors: Manuela Belmonte Mula, Almería (ES); Valentin Abad, Almería (ES)

(73) Assignee: NEW GROWING SYSTEMS, S.L.

( * ) Notice: Subject to any disclaimer, the term of this patent is extended or adjusted under 35 U.S.C. 154(b) by 0 days.

(21) Appl. No.: 17/924,048

(22) PCT Filed: May 4, 2021

(86) PCT No.: PCT/ES2021/070304
§ 371 (c)(1),
(2) Date: Nov. 8, 2022

(87) PCT Pub. No.: WO2021/229120
PCT Pub. Date: Nov. 18, 2021

(65) Prior Publication Data
US 2023/0270062 A1   Aug. 31, 2023

(30) Foreign Application Priority Data
May 11, 2020   (ES) .................... 202030424

(51) Int. Cl.
*A01G 31/04*   (2006.01)
*A01G 31/06*   (2006.01)
(Continued)

(52) U.S. Cl.
CPC ............. *A01G 31/04* (2013.01); *A01G 22/05* (2018.02)

(58) Field of Classification Search
CPC ...... A01G 31/04; A01G 31/06; A01G 31/047; A47G 2007/048; A47G 7/04; A47G 7/041;
(Continued)

(56) References Cited

U.S. PATENT DOCUMENTS 5,943,818 A * 8/1999 Fruehwirth .......... A01G 31/047
47/17

FOREIGN PATENT DOCUMENTS

JP   2000014250 A   *   1/2000
JP   2000014250 A       1/2000

OTHER PUBLICATIONS

International Search Report dated Jul. 8, 2021 in corresponding PCT International Application No. PCT/ES2021/070304.
(Continued)

*Primary Examiner* — Kristen C Hayes
(74) *Attorney, Agent, or Firm* — OSTROLENK FABER LLP

(57) ABSTRACT

It relates to a straightforward system, which can be used in any greenhouse, as it is not linked to the greenhouse, and which can maximise the area of crop plants per hectare. For this purpose, the invention proposes a system that is supported by struts (1) with a horizontal shaft (3) on which a support mechanism (4) for pairs of supports (5) of the hydroponic crop in question swings, so that they can adopt a position in which they are aligned horizontally, and another position in which they are aligned vertically, so that this position allows access to the plants for harvesting their fruit and therefore not having to leave unused spaces when the plants are aligned horizontally.

4 Claims, 4 Drawing Sheets

(51) Int. Cl.
*A47G 7/04* (2006.01)
*A01G 22/05* (2018.01)

(58) Field of Classification Search
CPC . A01K 97/10; A47J 47/16; A47J 37/04; A47J 37/043; A47J 37/042; E04H 12/2215
See application file for complete search history.

(56) References Cited

OTHER PUBLICATIONS

Written Opinion dated Jul. 8, 2021 in corresponding PCT International Application No. PCT/ES2021/070304.

* cited by examiner

ROTATIONAL SYSTEM FOR HYDROPONIC EQUIPMENT

CROSS-REFERENCES TO RELATED APPLICATIONS

The present application is a 35 U.S.C. §§ 371 national stage application of International Application No. PCT/ES2021/070304 filed May 4, 2021, which claims priority to Spanish Patent Application No. 2020-30424, filed May 11, 2020, the contents of which are incorporated herein by reference.

FIELD OF THE DISCLOSURE

The invention relates to a system for distributing plants in hydroponic crops, aimed at maximising the number of linear metres of crops in a surface area.

Therefore, the object of the invention is to provide a system that can increase the density of planted crops in a greenhouse using a straightforward structure, irrespective of the greenhouse it is implemented on, with the possibility of also being implemented outdoors, which makes it possible to optimise the exposure of plants to sunlight.

The invention is applicable to any type of hydroponic crop, being particularly suited for growing strawberries.

BACKGROUND OF THE INVENTION

In the scope of the practical application of the invention, which is hydroponic crops, maximising the density of plants per unit area is evidently a priority for every farmer.

The problem is that plants must be accessible, which requires having corridors to access said plants, which reduces the surface area available for plants.

An oscillating system is a known solution that tries to address this problem, which uses oscillating supports for plants that make it possible to use the space in the corridors so that when they are in use, the supports of the plants oscillate by folding the upper part thereof to leave the corresponding corridor unobstructed.

These types of mechanisms are supported from above, so they require a greenhouse with a structure that is very resistant, complex, and therefore expensive.

Moreover, this type of devices is difficult to assemble and require specialised workers and machinery (platforms, cranes, etc.), which also has a negative financial impact.

DESCRIPTION OF THE INVENTION

The rotational system for hydroponic equipment described fully addresses the drawback detailed above using a straightforward system, which can be used irrespective of the structure of the greenhouse so farmers do not have to replace or reinforce their existing greenhouses, with the possibility of also installing the system outdoors so long as the variety of the plant and the weather allow it.

More specifically, the system of the invention is comprised of a series of vertical struts that are driven into the ground, which comprise a "V" section angled at 90° near the upper end thereof, which as we will explain later will make it possible to align the supports of the hydroponic crops vertically.

The struts are finished on the upper end thereof with a horizontal shaft on which a series of pairs of arms swings by means of bearings, rollers, or any other conventional mean, with the ends of said arms holding the supports containing the hydroponic crops in question.

In this way, both supports can be arranged in two opposite working positions, aligned horizontally and aligned vertically, thus optimising the distribution of the struts aligned along the length of the greenhouse in relation to the optimal "vital" distance calculated for the plants in said horizontal position, so that it is not necessary to increase the distance between the lines of struts beyond the aforementioned distance between the supports of one row and the next one, since although in said position it is not possible to access the plants to harvest their fruit, when the arms are swung at 90°, the supports of the plants are aligned vertically, with one of the supports being housed in the aforementioned angled "V" section of the corresponding strut, so that it creates a large enough space between the lines of struts to allow the staff harvesting the fruit to walk through.

The double arms could be actuated by means of a powered gear, or in a more straightforward variation, they could be actuated by means of a lever connected to the rotational assembly of the double arms, with said lever having an "L" shape or elbow configuration due to how the supports of the crops are arranged, and the length of said lever will not be bigger than the height of the shaft that rotates said arms.

This structure provides the following advantages:

It maximises the density of crops without putting the production capacity at risk since it does not reduce the "vital" area of the plants.

It can be installed under the structure of any type of greenhouse, and even outdoors if the variety of plant and the weather conditions allow it, also being suitable for greenhouses with low ceilings.

It is easily adapted to the irregular perimeters of plots, thus minimising the amount of unused surface area.

It makes it possible to rearrange the plants throughout the day in the most suitable position to carry out photosynthesis.

It makes it easier to harvest the fruit and increases the yield since workers have more fruits in reach without having to move from their spot, which results in a significant reduction in harvesting costs.

It increases the density of plants per hectare, which depending on the type of plant could range between 150,000 and 200,000 plants per hectare.

Finally, it should be highlighted that the "V" configuration has been chosen for the aforementioned section of the struts and the arms since it is an optimal configuration and because the supports of hydroponic crops have "V" sections; however, we do not rule out other equivalent configurations that match the profile of the supports of said crops, such as a "U" shaped configuration, without this affecting the essence of the invention.

BRIEF DESCRIPTION OF THE DRAWINGS

To complete the invention described below and in order to give a better understanding of the characteristics of the invention, according to a preferred embodiment thereof, this description is accompanied by a set of drawings in which the figures described below have been represented for purely illustrative purposes and should not be construed as limiting.

PREFERRED EMBODIMENT OF THE INVENTION

Figure 1:
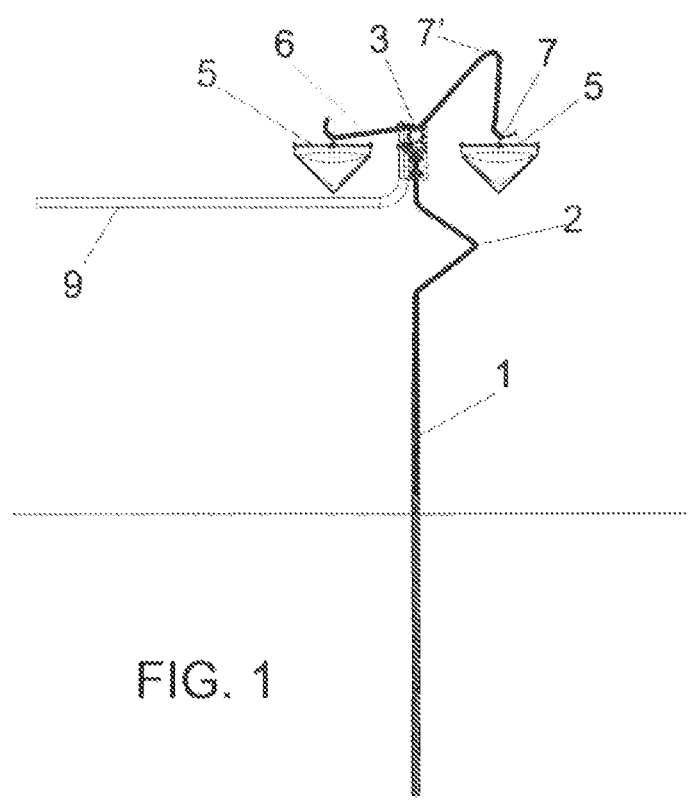
FIG. 1.—Shows a schematic elevation view of the mechanism comprised in a rotational system for hydroponic equipment according to the object of the present invention, which is arranged in a horizontal working position and corresponds to a variation embodiment with a manual actuator by means of a lever.
Figure 2:
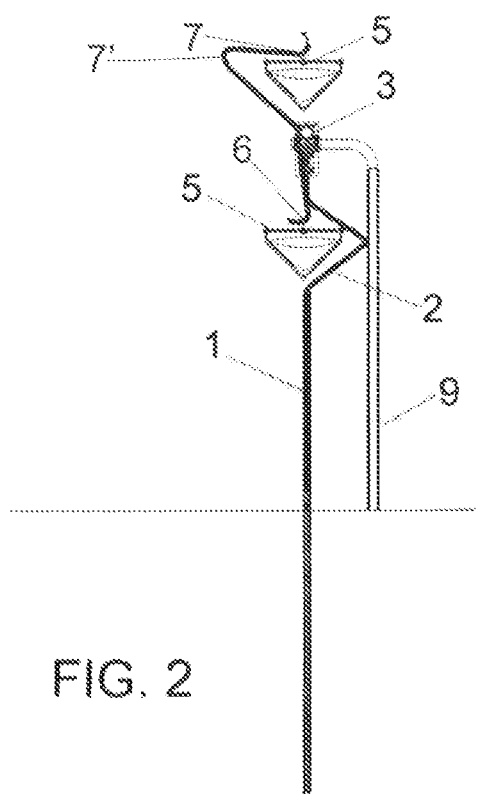
FIG. 2.—Shows a similar view as FIG. 1 but with the system arranged in the vertical position, which makes it possible to free up the space in the corridors to harvest the fruits of the plants.
Figure 3:
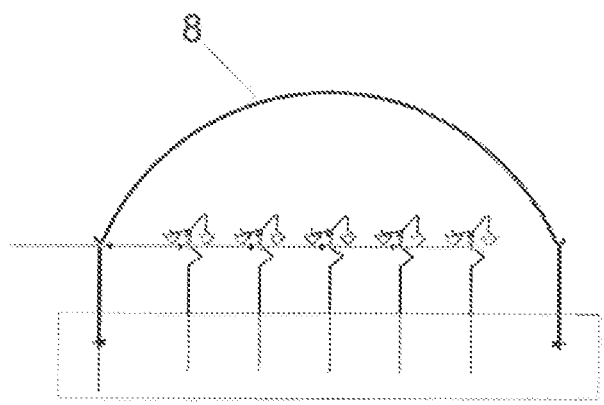
FIG. 3.—Shows a similar profile view as FIG. 1, but representing several mechanisms at the heart of a greenhouse.
Figure 4:
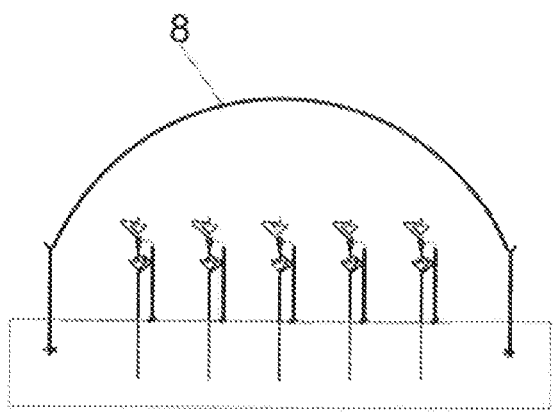
FIG. 4.—Shows a similar view as FIG. 3, but with the system arranged in the vertical position, which makes it possible to free up the space in the corridors to harvest the fruits of the plants.
Figure 5:
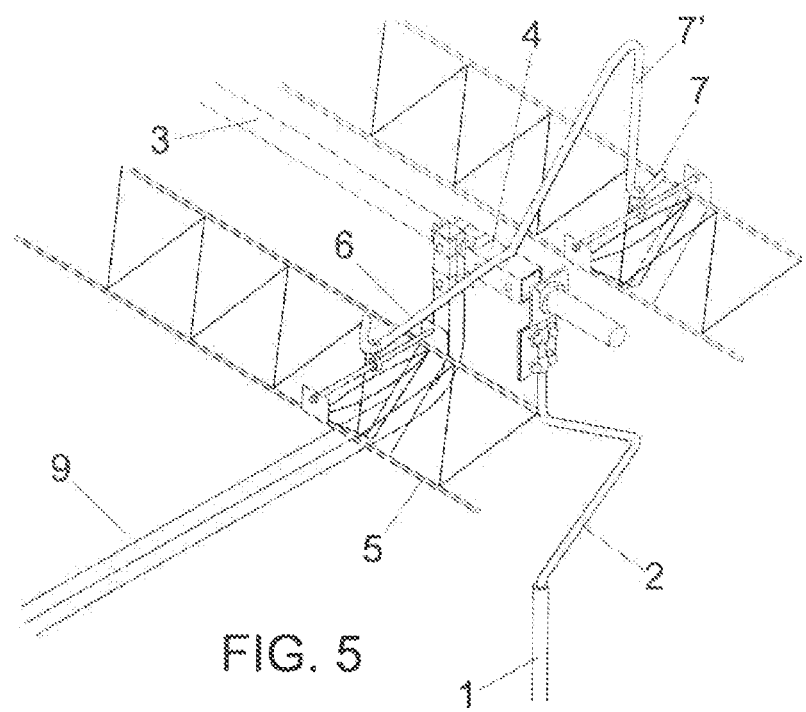
FIG. 5.—Shows a perspective view of a detail of the system, according to the position shown on FIGS. 1 and 3.
Figure 6:
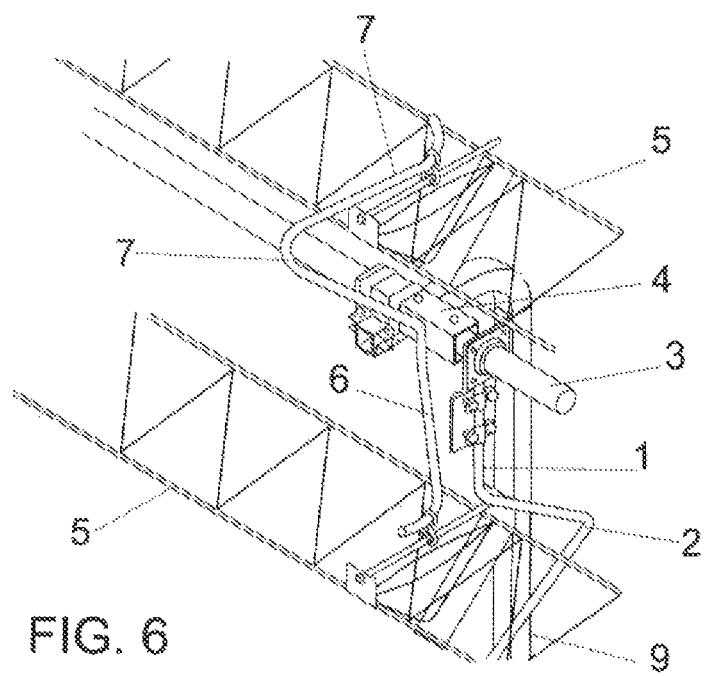
FIG. 6.—Finally, a perspective view of a detail of the system, according to the position shown on FIGS. 2 and 4.

In light of the drawings described above, the system of the invention comprises a series of rows or lines of struts (1) for supporting a structure on the ground, preferably by driving said struts on the ground, with said struts (1) comprising a "V" section angled at 90° (2) near the upper end thereof, which are finished on the upper end thereof with a horizontal shaft (3) on which a support mechanism (4) for pairs of supports (5) of the hydroponic crop in question swings, with said supports hanging from said mechanism by means of respective arms (6-7), so that the arm (7) aimed at arranging the relevant support (5) in the vertical position to allow access to the plants, as shown on FIGS. 2, 4 and 6, comprises a "V" section (7'), just like the "V" section angled at 90° (2) of the struts (1), which according to the aforementioned figures makes it possible to house therein the supports (5) with their corresponding plants when the support mechanism is rotated so that the plants are aligned vertically, freeing up space between the struts (1) and allowing access to harvest the fruit, so that the lateral distance between the lines of struts (1) can be minimised in relation to the distribution shown on FIGS. 3 and 4 of a greenhouse (8).

Although in the figures the support mechanism (4) is actuated manually by means of an "L" shaped lever (9) connected to said rotating support mechanism (4), said mechanism could be actuated by a powered gear that not only makes it possible to change the arrangement of the supports of the plants in order to gain access to them, but it can also be programmed to change the relative position of said supports in relation to the angle of solar radiation in order to optimise the process of photosynthesis of the plants.

The invention claimed is:

1. Rotational system for hydroponic equipment, comprising: rows or lines of struts for supporting the equipment on the ground, with said struts comprising a "V" section angled at 90° near an upper end thereof, or a configuration matching a profile of supports of a hydroponic crop in question, said struts are finished on the upper end thereof with a horizontal shaft, on which a support mechanism for pairs of supports of the hydroponic crop in question swings, with said supports hanging from said mechanism by means of respective arms, wherein one of said arms comprises a "V" section, with the system comprising means to adjust the positioning angle of the support mechanism between two opposite working positions, a position in which the supports of the hydroponic crop are aligned horizontally, and another position in which the supports are aligned vertically.

2. Rotational system for hydroponic equipment, according to claim 1, wherein the means for adjusting the positioning angle of the support mechanism is embodied with a powered gear.

3. Rotational system for hydroponic equipment, according to claim 1, wherein the powered gear includes means for actuating said gear in relation to the angle of solar radiation.

4. Rotational system for hydroponic equipment, according to claim 1, wherein the means for regulating the positioning angle of the support mechanism are embodied by means of an "L" shaped lever that is connected to the rotating support mechanism.

\* \* \* \* \*